United States Patent [19]
Fleig et al.

[11] Patent Number: 5,653,830
[45] Date of Patent: Aug. 5, 1997

[54] SMOOTH-SURFACED PHOSPHOR SCREEN

[75] Inventors: Gordon E. Fleig, Oakland; Donald E. Gueffroy, Davis, both of Calif.

[73] Assignee: Bio-Rad Laboratories, Inc., Hercules, Calif.

[21] Appl. No.: 496,240

[22] Filed: Jun. 28, 1995

[51] Int. Cl.⁶ .............................. B05D 5/06; C09K 11/70
[52] U.S. Cl. .................. 156/67; 156/235; 156/237; 156/241; 427/73; 976/DIG. 439
[58] Field of Search .................. 156/67, 231, 235, 156/237, 238, 241; 976/DIG. 439; 427/73, 64; 250/484.4, 483.1; 428/913, 914

[56] References Cited

U.S. PATENT DOCUMENTS

| | | | |
|---|---|---|---|
| 2,716,081 | 8/1955 | Marks | 156/67 |
| 2,719,082 | 8/1955 | Smith | 156/67 |
| 3,814,979 | 6/1974 | Eberhardt . | |
| 3,852,131 | 12/1974 | Houston | 156/230 |
| 3,852,132 | 12/1974 | Houston | 156/230 |
| 4,264,408 | 4/1981 | Benham . | |
| 4,437,011 | 3/1984 | Noji et al. . | |
| 4,455,323 | 6/1984 | Ishizuka | 976/DIG. 439 |
| 4,528,210 | 7/1985 | Noji et al. . | |
| 4,661,419 | 4/1987 | Nakamura | 976/DIG. 439 |
| 4,698,508 | 10/1987 | Nakamura | 976/DIG. 439 |
| 4,728,583 | 3/1988 | Yamazaki et al. | 428/691 |
| 4,812,660 | 3/1989 | Lindmayer | 428/691 |
| 4,822,520 | 4/1989 | Lindmayer . | |
| 4,935,617 | 6/1990 | Anno et al. . | |
| 5,028,435 | 7/1991 | Katz et al. . | |
| 5,028,793 | 7/1991 | Lindmayer et al. . | |
| 5,029,247 | 7/1991 | Anno et al. . | |
| 5,322,832 | 6/1994 | Takeyama et al. . | |

*Primary Examiner*—Daniel Stemmer
*Attorney, Agent, or Firm*—Townsend and Townsend and Crew LLP

[57] ABSTRACT

A phosphor screen with a smooth-surfaced phosphor layer is formed by casting a phosphor layer in liquid form on a sheet to which the layer adheres without bonding. The exposed surface of the layer is then solidified and bonded to a permanent substrate. The sheet on which the phosphor has been cast is then removed, leaving a smooth exposed surface, which may then be covered with a transparent protective layer.

18 Claims, 3 Drawing Sheets

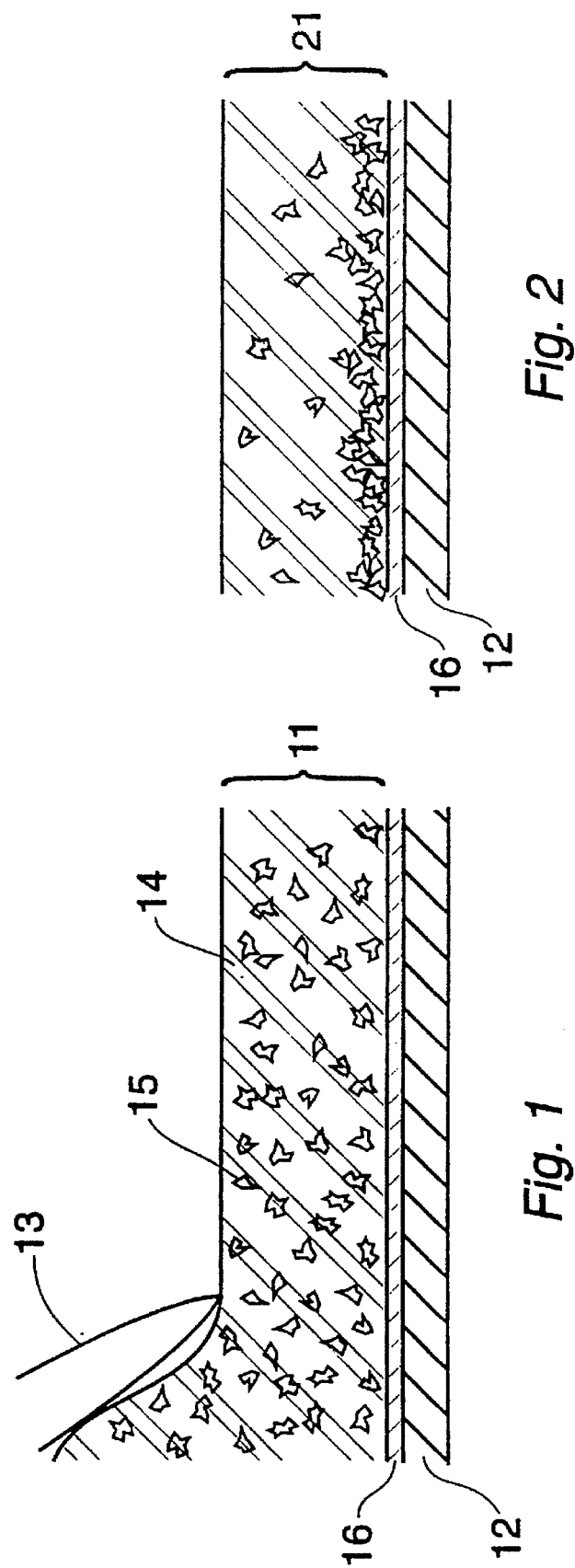

SMOOTH-SURFACED PHOSPHOR SCREEN

This invention lies in the field of biochemical assays and detection methods, and relates in particular to phosphor screens used for the recordation of autoradiographic images.

BACKGROUND OF THE INVENTION

The detection and imaging of macromolecules is an essential part of many procedures performed in molecular biology laboratories, such as protein assays, DNA sequencing, and gene mapping. Detection and imaging are generally performed by labeling the molecules of interest with a radioactive species and recording the radioactive emission from the molecules on a film or screen.

Phosphor screens, which have recently been introduced as an alternative to x-ray films as the recording medium, offer the ability to be scanned. This permits the operator to store the recorded data on magnetic or optical media such as computer hard drives, floppy disks and CD ROMs. The recorded information can then be transmitted electronically, and analyzed and manipulated by computer to provide information at a high level of detail.

Phosphor screens are commonly formed by coating a solid substrate with a slurry of phosphor particles dispersed in a liquid resin, then curing the resin to form a solidified layer. The quality of the image which is then stored in the phosphor layer will depend on the gap between the sample and the surface of the layer and on the quality of the surface itself. By limiting the gap, one can maximize the image sharpness by limiting the extent to which the signal emitted by the sample spreads before reaching the phosphor surface. As for the surface, any deviations from a smooth planar surface can affect images recorded from low energy signals since these signals penetrate only a few microns into the phosphor layer. For a $^{14}C$ signal, for example, the upper 20 microns of the layer will retain 90% of the signal, while for a $^3H$ signal, the same proportion will reside within the upper 2 microns. Thus, irregularities in the surface will affect the quality of the image regardless of the depth of the phosphor layer, and the effect of these irregularities is magnified as the gap between the sample and the surface narrows.

A further factor affecting the sensitivity of the screen is the particle size of the phosphors, larger particles having greater sensitivity than smaller particles. The most sensitive particles are those with diameters of 10 microns or greater. Particles of this size and greater tend to produce a surface which is rough and uneven. Also, these particles are easily dislodged from the surface, further adding to the surface unevenness.

In the conventional casting procedure described above, the particles settle randomly as the slurry dries. The surface of the resulting phosphor layer is variable, depending on the particle size and uniformity, the viscosity and consistency of the resin as it affects the settling behavior of the particles, and the manner in which the slurry is dried. Irregularities in the surface contour result from phosphor particles with jagged and pointed edges protruding from the surface.

In addition to obscuring the image, these irregularities make it difficult to apply a protective film over the surface. Protective films protect the surface from moisture, which renders the phosphors susceptible to chemical deterioration, and from physical abrasion, which contaminates the surface with debris that must be removed before the screen can be used to its maximum effect. Particles protruding from the surface tend to pierce the protective film, thus creating passages through which atmospheric moisture can penetrate the film to the underlying phosphor layer. In addition, large protruding particles at the surface can become dislodged and thereby create both large discontinuities in the surface contour and large gaps in the film.

Even when the protective film completely covers the phosphor layer, techniques for applying the film do not compensate for the deformities of the phosphor surface. Depressions in the phosphor surface tend to receive greater amounts of the deposited film than elevated regions, and the difference in film thickness may vary by as much as 10 to 20 microns. For very weak emitters such as $^3H$, a variation in film thickness of 1.0 micron can cause a signal attenuation of more than 50%.

SUMMARY OF THE INVENTION

It has now been discovered that a phosphor screen with a smooth-surfaced phosphor layer can be formed by a variation of the casting procedure of the prior art. According to this variation, the phosphor layer is applied to a sheet on which it can be solidified and will adhere in a removable manner without bonding. The exposed surface of the layer is then bonded to a substrate which will form the support for the final phosphor screen. The sheet adhering to the opposing surface of the phosphor layer is retained as a protective cover until the screen is used, at which time the sheet is easily removed. Application of the phosphor layer is performed by applying the phosphor to the sheet in fluid form, preferably as a slurry as in the prior art, and the settling of the phosphor particles against the casting sheet results in a substantially smooth, even particle interface at the sheet surface. This interface becomes the exposed surface of the phosphor layer when the substrate is bonded to the other side and the sheet is removed. The exposed surface can then be used uncoated or coated with a protective film, which will readily be formed with a substantially uniform film thickness.

These and other features and advantages of the invention are described in detail below.

BRIEF DESCRIPTION OF THE DRAWINGS

FIG. 1 is a cross section of a phosphor layer being applied to a sheet coated with a release agent.

FIG. 2 is a cross section of the phosphor layer on the sheet after the layer has been solidified.

DETAILED DESCRIPTION OF THE INVENTION AND PREFERRED EMBODIMENTS

Figure 4:
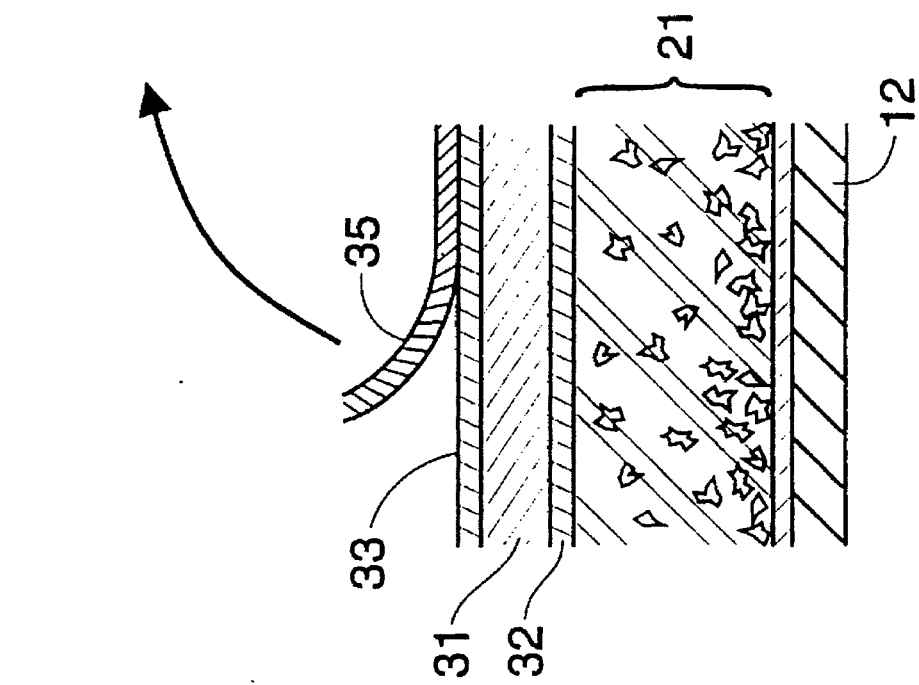
FIG. 4 is a cross section of the inverted sheet-backed phosphor layer laminated to the plastic film, with the remaining release liner in the process of being removed.

Application of the phosphor layer to the removable sheet is performed by using a fluid form of the phosphor. Preferred fluids are slurries of phosphor particles in aqueous or organic liquids. Particularly preferred are slurries in liquid resins which can be cured or otherwise solidified to serve as transparent binders once the fluid has been applied to the sheet.

The choice of resin is not critical and can vary widely. Examples are polyesters, polyalkylenes, polyacrylates, polyacrylate esters, polyvinylacetals, polyvinyl alcohols, polyvinyl butyral, polycarbonates, cellulose triacetate, polystyrene, polyurethanes, polyamides, polyureas, epoxies, phenoxy resins, polycaprolactones, polyacrylonitrile, copolymers of vinyl chloride with isobutyl ether or vinyl propionate, and copolymers of styrene with acrylate, acrylonitrile or ethylene chloride. Polyacrylate esters, polymethyl methacrylate, polyethyl methacrylate, and polyvinyl butyral are preferred.

The resin prior to application of the slurry to the sheet may be partially cured and may either be liquid or rendered liquid by moderate heating or by being dissolved in an inert solvent. Alternatively, the resin may be fully cured prior to application and rendered liquid by an inert solvent. Removal of the solvent can be achieved by conventional means, notably evaporation, with heating if required. Any conventional solvent meeting these requirements can be used, the optimal choice depending on the resin. Examples are water, ethanol, propanol, methyl cellosolve, ethyl cellosolve, toluene, xylene, chlorobenzene, acetone, methyl ethyl ketone, methyl isobutyl ketone, tetrahydrofuran, dioxane, ethylene glycol monomethyl ether, ethylene glycol monomethyl ether acetate, butylene glycol monomethyl ether, butylene glycol monomethyl ether acetate, propylene glycol monomethyl ether, propylene glycol monomethyl ether acetate, chloroform, and trichloroethylene.

Phosphors useful in this invention are any of the wide range of materials capable of phosphorescence. Included among these materials are natural minerals and biological compounds as well as synthetically prepared materials and blends. Examples are metal halophosphates such as $Ca_5(PO_4)_3(F,Cl):Sb(III)$, $Mn(II)$, $Sr_5(PO_4)_3(Cl):Eu(II)$, $Sr_5(PO_4)_3(F,Cl):Sb(III),Mn(II)$ and $[SrEu(II)]_5(PO_4)_3Cl$; other rare-earth-activated phosphors such as $Y_2O_3:Eu(III)$, $SrB_4O_7:Eu(II)$, $BaMg_2Al_{16}O_{27}:Eu(II)$, $Y(VO_4):Eu(III)$, $Y(VO_4)PO_4:Eu(III)$, $Sr_2P_2O_7:Eu(II)$, $SrMgP_2O_7:Eu(II)$, $Sr_3(PO_4)_2:Eu(II)$, $Sr_5Si_4Cl_6O_{10}:Eu(II)$, $Ba_2MgSi_2O_7:Eu(II)$, $GdOS:Tb(III)$, $LaOS:Tb(III)$, $LaOBr:Tb(III)$, $LaOBr:Tm(III)$ and $Ba(F,Cl)_2:Eu(II)$; other aluminate-host phosphors such as $Ce_{0.65}Tb_{0.35}MgAl_{11}O_{19}$; silicate-host phosphors such as $Zn_2SiO_4:Mn(II)$; and fluoride-host phosphors such as $Y_{0.79}Yb0.02Er0.01F_3$, $La_{0.86}Yb_{0.12}Er_{0.02}F_3$, and $Y_{0.639}Yb_{0.35}Tm_{0.001}F_3$. Still further materials are alkaline earth metal sulfides and selenides. These are optionally doped with samarium, europium, cerium, or a combination of these elements as well as their oxides, sulfides or fluorides. A still further optional ingredient is a fusible salt such as lithium fluoride, barium sulfate or both, to serve as a flux.

The particle size of the phosphors in the slurry may vary, but as indicated above, the sensitivity will increase as the particle size increases. The invention is applicable in the broad sense to phosphor particles of diameters ranging from about 10 microns to about 100 microns, and preferably particles ranging in size from about 15 microns to about 75 microns, and most preferably from about 20 microns to about 45 microns.

The slurry may also contain additional ingredients such as dispersants to prevent rapid settling of the phosphor particles, and plasticizers to achieve a phosphor layer with a lowered risk of cracks and delamination. Any of the variety of materials known in the art for these purposes can be used. Examples of dispersants are phosphate esters, polyacrylates, polymethacrylates, polymaleates, condensed phosphates, polysulfonates, sulfonated polycondensates, tannins, lignins, glucosides and alginates. Examples of plasticizers are diisobutyl adipate, di-n-hexyl adipate, bis(2-ethylhexyl) adipate, bis(2-butoxyethyl) adipate, bis(2-ethylhexyl) azelate, diethylene glycol dibenzoate, tri-n-butyl citrate, diethylene glycol dipelargonate, methyl phthalyl ethyl glycolate, butyl phthalyl butyl glycolate, hydrogenated terphenyls, chlorinated paraffin, di-2-ethylhexyl isophthalate, butyl oleate, tributyl phosphate, triphenyl phosphate, isopropylphenyl diphenyl phosphate, chlorinated polyphosphonate, dimethyl phthalate, dibutyl phthalate, dioctyl phthalate, butyl cyclohexyl phthalate, adipic acid polyester, azelaic acid polyester, methyl ricinoleate, bis(2-ethylhexyl) sebacate, n-butyl stearate, sucrose acetate-isobutyrate, N-ethyl-(o,p)-toluene sulfonamide, dibuty tartrate, bis(2-ethylhexyl) terephthalate, tris(2-ethylhexyl) trimellitate, and camphor.

In one example of a formulation for the phosphor slurry, the phosphor is RD-55, which is strontium sulfide activated with cerium and samarium, with a particle size of 20–45 microns; the binder is Acryloid A-10S or B-72 binder, an acrylic binder dissolved in propylene glycol monomethyl ether acetate at a solids content of 30–40% by weight (available from Rohm and Haas Co., Philadelphia, Pa., USA); the additional solvent is propylene glycol monomethyl ether acetate; the dispersant is TRITON® X-100 (Union Carbide Corporation, Danbury, Conn., USA) or WITCO® PS-21A (Witco Corp., New York, N.Y., USA); and the plasticizer is dioctyl phthalate. A typical formulation without the dispersant and plasticizer may contain 80 parts by weight of the phosphor, and 20 parts by weight each of the binder solution and the added solvent. With the dispersant and plasticizer, a typical formulation may contain 80 parts by weight of the phosphor, 14 parts by weight each of the binder solution and the added solvent, 0.4 parts by weight of the dispersant and 0.8 parts by weight of the plasticizer. These are merely examples; other formulations will be readily apparent to those skilled in this art.

The removable sheet to which the phosphor in fluid form is applied can be any of a wide variety of materials, provided only that the sheet material is inert, can withstand any conditions required for curing the binder, and either does not bond to the binder or is coated with an agent which does not bond to the binder. The sheet is preferably one which is flexible to permit easy removal by peeling.

The sheet is preferably either paper or plastic, and a wide variety of plastics can be used. Examples are acrylic polymers (notably poly(methyl methacrylate)), cellulosics (such as cellulose acetate, cellulose triacetate, cellulose acetate butyrate, and cellulose acetate propionate), fluoroplastics (such as poly(vinyl fluoride), poly(vinylidene fluoride), polytrifluorochloroethylene copolymers, and poly(tetrafluoroethylene)), ionomer resins, vinyl resins (such as poly(vinyl chloride), poly(vinyl alcohol), poly(vinyl fluoride), vinyl chloride-vinyl alcohol copolymers, and poly(vinylidene chloride)), polyesters (notably polyethylene terephthalate), polyurethanes, polybutylene, polycarbonate, polyethylene, polyimides, polypropylene, and polystyrene.

The thickness of the sheet is not critical, provided only that it be thick enough to permit application of the fluid phosphor, yet thin enough to provide sufficient flexibility to allow it to be removed easily once the phosphor layer is laminated to the substrate. A typical thickness is 2 to 5 mil (50 to 125 microns).

Release agents suitable for use include any of the wide variety of materials known for this purpose. Examples are silicones (notably dimethylsiloxane polymers), waxes (such as petroleum waxes, Carnauba waxes, spermaceti, zinc stearate, calcium stearate and magnesium stearate), fluorocarbons (in the form of oils, waxes and dispersions), certain liquid forms (such as solutions) of polymers such as poly (vinyl acetate) and poly(vinyl alcohol), and solid materials such as talc, mica, fused silica, kaolin and attapulgite.

Application of the fluid-form phosphor to the sheet can be done by any conventional method, such as for example by the use of tape-casting machines using doctor blades to control the thickness of the coating. Once the coating is applied, the fluid is permitted to solidify, which may involve drying, organic solvent evaporation, curing, or a combination of these.

Once the phosphor layer is solidified, the exposed surface of the layer is bonded to a substrate which will ultimately serve as the support for the phosphor screen. The substrate may be any rigid material, and bonding may be achieved by any method which provides a permanent bond. Preferred support materials are plastic, glass, paper, metal, and metal compounds such as oxides. Metals such as aluminum, steel, and magnesium are particularly preferred, with aluminum the most preferred. Examples of adhesives to bond the phosphor layer to the substrate are epoxies, phenolic resins, acrylics and urethanes. A particularly convenient method of applying the adhesive is by use of an intermediate sheet coated on both sides with the adhesive, and laminating the film-backed phosphor layer to the substrate with the adhesive-coated sheet interleaved between the phosphor and the substrate. The film-backed phosphor sheet is also useful without a rigid substrate, for applications where bending or flexibility of the phosphor sheet is desirable.

Once the film-backed phosphor layer is laminated to the substrate, the film backing can be removed, leaving the smooth phosphor surface. If protection of the surface is desired, the surface can then be coated with a protective coating to protect the phosphors from abrasion and exposure to moisture. Protective films of various materials have been disclosed, including silicon dioxide ($Si_2O_2$), alumina ($Al_2O_3$), indium oxide ($InO_2$), polyesters (such as MYLAR®, DuPont de Nemours Co., Wilmington, Del., USA), cellulose acetate, polymethyl methacrylate, polyethylene terephthalate, polyethylene and parylenes. Examples of parylenes are poly(1,4-dimethylbenzene), poly(2-chloro-1,4-dimethylbenzene) and poly(1,5-dichloro-2,4-dimethylbenzene). The film may be applied by any conventional means. Plasma coating is one particularly effective method.

One method of implementing the concepts of the present invention is shown in the drawings. FIG. 1 shows a phosphor slurry 11 being applied to a carrier film 12 by a doctor blade 13. The slurry 11 includes a fluid phase 14 consisting of a resin, a dispersing agent, a plasticizer, and a solvent for each of these three components, plus solid particles 15 of phosphor dispersed uniformly throughout the slurry. The carrier film 12 is coated with a release agent 16. As one example, a coating thickness ranging from 0.008 inch (203 microns) to 0.028 inch (712 microns) may be used, although the optimal thickness will vary with the various other parameters of the system. FIG. 2 shows carrier film 12 with the solid phosphor-resin layer 21 resulting from the evaporation of the solvent and the curing of the resin. A coating of the thickness indicated above may for example be dried under flowing nitrogen for about an hour, then left to harden for an additional twelve hours. During this time, the phosphor particles 15 have partially settled to the bottom of the resin layer 21, forming a high concentration at the interface between the resin layer 21 and the carrier film surface.

Figure 3:
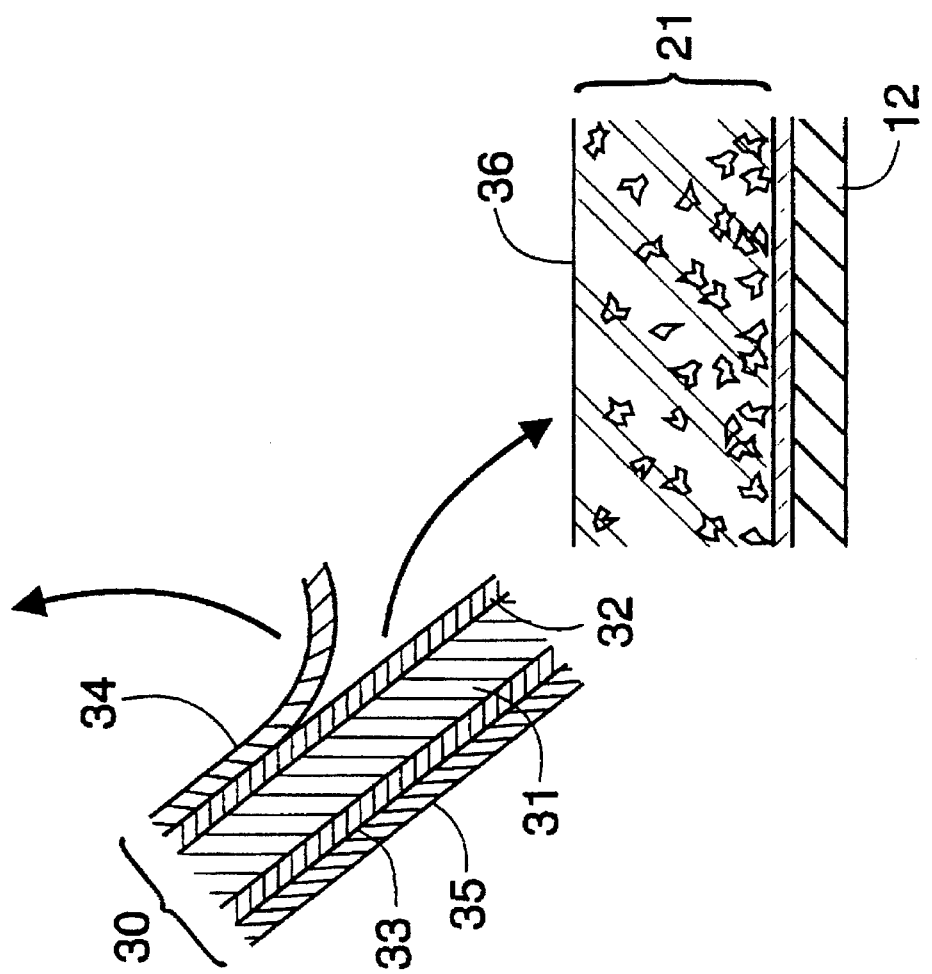
FIG. 3 is a cross section of the sheet-backed phosphor layer of FIG. 2 being applied to a plastic film coated on both sides with an adhesive and covered with release liners, with one of the release liners in the process of being removed.
Figure 6:
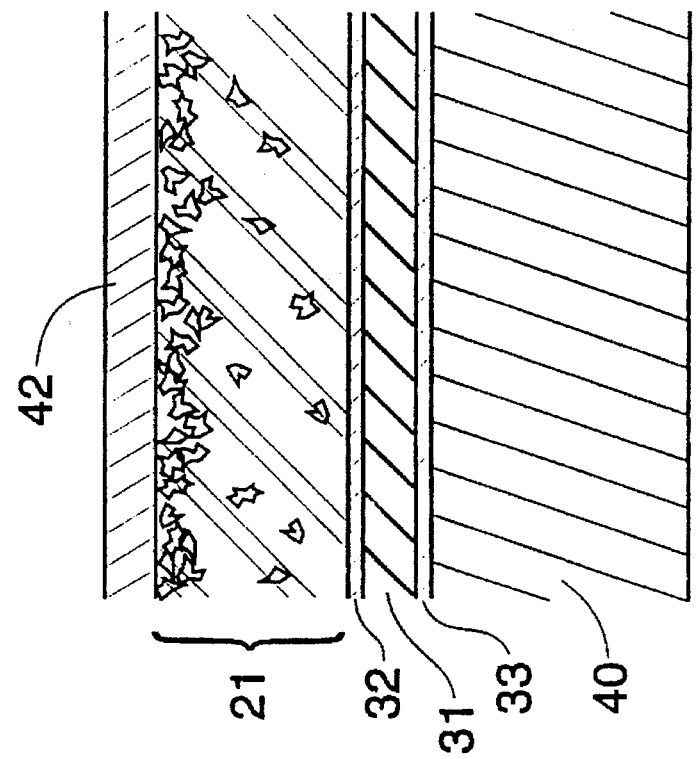
FIG. 6 is a cross section of the laminate of FIG. 5 with a protective film placed over the phosphor surface.

In FIG. 3, an adhesive-coated intermediate sheet 30 is placed over the solidified phosphor layer 21 with the carrier film 12 still adhering to the phosphor layer. The intermediate sheet 30 consists of a plastic film 31 coated on both sides with layers of adhesive 32, 33 which are in turn protected by release liners 34, 35. An example of this type of plastic film is a polyester film designated DFM-200C, from Flexcon Co., Inc., Spencer, Mass., USA, coated on both sides with V-23 acrylic contact adhesive and with silicone-coated paper as release liners. The upper release liner 34 is removed before the film is applied to the phosphor layer 21, and the exposed adhesive layer 32 is placed directly over the exposed surface 36 of the phosphor layer, i.e., the surface opposite the interface where the phosphor particles have concentrated as a result of the settling which that has occurred during the curing stage. The phosphor layer 21 and adhesive-coated plastic film 30 are laminated together by a pressure roller, forming the laminate shown in FIG. 4. The laminate is then cut to the desired size and shape, and the lower release liner 35 on the plastic film is then removed, as shown by the arrow, exposing the lower adhesive layer 33.

Figure 5:
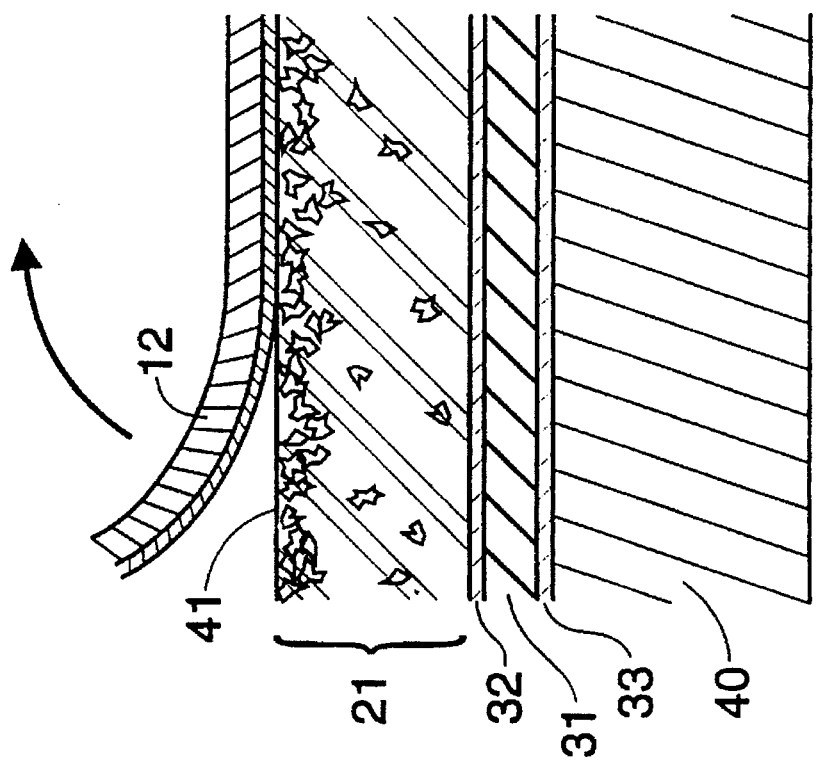
FIG. 5 is a cross section of the laminate of FIG. 4 further laminated to a solid support plate, with the sheet covering the phosphor surface in the process of being removed.

The lower adhesive layer 33 is then placed in contact with the surface of a flat anodized aluminum plate 40, as shown in FIG. 5, and the plate is laminated to the plastic film 31 and phosphor layer 21 through the adhesive. The resulting screen is dried at 50° C. for 48 hours. The carrier film 12 is then peeled off, as shown by the arrow in FIG. 5, exposing a smooth surface 41 of the phosphor layer, i.e., the surface at which the phosphor particles are concentrated. The protective film 42 is then applied over the smooth phosphor surface.

The foregoing is offered primarily for purposes of illustration. It will be readily apparent to those skilled in the an that the materials, dimensions, proportions, procedural steps and other parameters of the method and laminate described herein may be further modified or substituted in various ways without departing from the spirit and scope of the invention.

What is claimed is:

1. A method for forming a phosphor imaging screen having a substantially planar phosphor surface, said method comprising:

(a) forming a phosphor layer on a smooth-surfaced sheet in an adhering but non-bonding manner by applying a phosphor thereto in fluid form and solidifying the phosphor thus applied, thereby forming a phosphor layer with an exposed side and a sheet-protected side;

(b) bonding said exposed side of said phosphor layer to a substrate to form a sheet-protected phosphor/substrate laminate; and (c) removing said smooth-surfaced sheet from said sheet-protected phosphor/substrate laminate, leaving a substantially planar phosphor surface.

2. A method in accordance with claim 1 in which (a) comprises applying said phosphor as a slurry of phosphor particles in a solution of binder and volatile solvent to form a coating on said smooth-surfaced sheet, and evaporating said solvent from said coating.

3. A method in accordance with claim 2 in which (a) is performed with said smooth-surfaced sheet in a substantially horizontal position and with said slurry applied to the top surface of said smooth-surfaced sheet.

4. A method in accordance with claim 2 in which said phosphor particles have an average diameter of from about 10 microns to about 100 microns.

5. A method in accordance with claim 2 in which said phosphor particles have an average diameter of from about 15 microns to about 75 microns.

6. A method in accordance with claim 1 in which said smooth-surfaced sheet of (a) is a flexible polymeric sheet coated with a release agent.

7. A method in accordance with claim 1 in which said substrate is a flexible sheet.

8. A method in accordance with claim 1 in which said substrate is a rigid solid and (b) comprises bonding said phosphor layer thereto with a polymeric adhesive.

9. A method in accordance with claim 8 in which said substrate is aluminum.

10. A method in accordance with claim 8 in which (b) comprises laminating said phosphor layer to said rigid solid with an intermediate sheet interleaved therebetween, said intermediate sheet pre-coated on both sides with said adhesive.

11. A method in accordance with claim 1 further comprising:

(d) applying a radiation-transmissive protective coating to said substantially planar phosphor surface.

12. A method in accordance with claim 11 in which said protective coating is a parylene polymer.

13. A method in accordance with claim 12 in which said parylene polymer is a member selected from the group consisting of poly(1,4-dimethylbenzene), poly(2-chloro1,4-dimethylbenzene) and poly(1,5-dichloro-2,4-dimethylbenzene).

14. A method in accordance with claim 11 in which said protective coating is a member selected from the group consisting of silicon dioxide, alumina and indium oxide.

15. A method in accordance with claim 1 in which said phosphor comprises a member selected from the group consisting of alkali metal sulfides and selenides.

16. A method in accordance with claim 1 in which said phosphor comprises a member selected from the group consisting of calcium and strontium sulfides and selenides.

17. A method in accordance with claim 1 in which said phosphor comprises a member selected from the group consisting of calcium and strontium sulfides and selenides, and is doped with a member selected from the group consisting of samarium, europium, cerium or a combination thereof.

18. A method in accordance with claim 1 in which said phosphor comprises a member selected from the group consisting of calcium sulfide and strontium sulfide, and is doped with a member selected from the group consisting of samarium, europium, cerium or a combination thereof.

* * * * *